United States Patent [19]

Tsuruoka

[11] Patent Number: 5,592,344
[45] Date of Patent: Jan. 7, 1997

[54] AC BIAS CONTROL CIRCUIT FOR MAGNETIC RECORDING HEAD

[75] Inventor: Tatsuya Tsuruoka, Kanagawa, Japan

[73] Assignee: Sony Corp., Japan

[21] Appl. No.: 568,799

[22] Filed: Dec. 7, 1995

Related U.S. Application Data

[63] Continuation of Ser. No. 317,565, Oct. 4, 1994, abandoned.

[30] Foreign Application Priority Data

Oct. 6, 1993 [JP] Japan ................................ 5-250693

[51] Int. Cl.⁶ ............................ G11B 5/03; G11B 5/02
[52] U.S. Cl. ................................ 360/66; 360/68
[58] Field of Search ........................ 360/65, 66, 67, 360/68

[56] References Cited

U.S. PATENT DOCUMENTS

| | | | |
|---|---|---|---|
| 4,512,005 | 4/1985 | Okano | 360/65 |
| 4,616,273 | 10/1986 | Ishii et al. | 360/66 |
| 5,237,464 | 8/1993 | Cronch et al. | 360/65 |
| 5,424,883 | 6/1995 | Koren | 360/65 |

*Primary Examiner*—Aristotelis Psitos
*Assistant Examiner*—Regina Y. Neal
*Attorney, Agent, or Firm*—Ronald P. Kananen

[57] ABSTRACT

An Alternating Current bias control circuit for a magnetic recording head which is suitable to be formed by an Integrated Circuit, wherein a band-pass filter for extracting an audio frequency signal component from a terminal voltage of the magnetic recording head and for supplying the audio frequency signal component to a peak detector is formed by a Resistor-Capacitor circuit. The input impedance of the band-pass filter is made high enough to reduce the power consumption, and the output impedance of the same is made low enough to facilitate impedance matching with the peak detector.

11 Claims, 2 Drawing Sheets

5,592,344

AC BIAS CONTROL CIRCUIT FOR MAGNETIC RECORDING HEAD

This application is a continuation of application Ser. No. 08/317,565 filed Oct. 4, 1994, now abandoned.

BACKGROUND OF THE INVENTION

1. Field of the Invention

The present invention relates to an AC bias control circuit and, more particularly, is directed to an AC bias control circuit for superimposing an AC bias current onto a recording head in a magnetic recording apparatus.

2. Description of the Related Art

When a signal is recorded on a magnetic tape through a recording head, a predetermined amplitude of AC bias current is superimposed onto a recording signal current in order to eliminate the distortion of the signal to be recorded to thereby widen the dynamic range of the recorded signal.

FIG. 1 shows a relationship with respect to a low-frequency band signal between the quantity of AC bias applied to the recording head and the maximum signal level which can be recorded on a magnetic tape. As is apparent from FIG. 1, the signal level becomes the maximum when the AC bias current is in the vicinity of +6 dB.

FIG. 2 shows a relationship with respect to a high-frequency band signal between the quantity of AC bias applied to the recording head and the maximum signal level which can be recorded on a magnetic tape. As is apparent from FIG. 2, the signal level becomes the maximum and minimum when the AC bias current is in the vicinity of −6 dB and +6 dB, respectively.

There is, therefore, no optimum bias current common to both the low- and high-frequency band signals, and conditions for obtaining an optimum bias current common to both the low- and high-frequency band signals are contradictory to each other. Heretofore, therefore, a bias current at an intermediate position between the optimum points for both the low- and high-frequency band signals was selected as compromise of those contradictory conditions.

The above-mentioned maximum signal level depends on also a signal to be recorded. That is, when the recording signal is a broad band signal over from a low-frequency band to a high-frequency band, a high-frequency band signal has a biasing effect on a low-frequency band signal so that the quantity of effective bias becomes large.

Therefore, in this case, there arises a problem that a set bias point was changed by a recording signal, so that the bias point becomes deeper than the optimum value. In addition, since a high-frequency band signal has a biasing effect in itself, there arises a problem that the biasing point becomes deeper than the optimum value even with respect to the high-frequency band signal.

Such a circuit arrangement as shown in FIG. 3 has been proposed as a circuit for overcoming the aforesaid problems. In FIG. 3, the circuit includes a recording head 1 and a low-pass filter 4 which is constituted by a resistor 2 and a capacitor 3.

The circuit further includes a peak detector 5, and a differential amplifier 6. The differential amplifier 6 has an input 7 connected to the output of the peak detector 5 and another input 8 connected to a reference voltage source 9 so that a differential signal between input signals applied to the inputs 7 and 8 is developed at its output 11.

The output of an oscillator 12 is applied to an input of a voltage control amplifier 10 and the output of the voltage control amplifier 10 is applied to one input of an adder 14. The output of the differential amplifier 6 is applied to a gain control input 11 of the voltage control amplifier 10.

A recording signal input terminal 13 is connected to the other input of the adder 14. The output of the adder 14 is applied to the recording head 1. The output of the oscillator 12 is applied also to an erasing head 15. A reference numeral 16 represents a magnetic tape.

The operation of the circuit of FIG. 3 will be described. When recording a signal onto the magnetic tape 16, the tape 16 is transported from left to right in FIG. 3. If there are signals recorded on the tape 16, those signals are erased by the erasing head 15. At that time, an oscillation output B is applied from the oscillator 12 to the easing head 15.

A part of the oscillation output B of the oscillator 12 is supplied to and amplified by the voltage control amplifier 10 and then applied to the adder 14 as an AC bias signal. The amplified AC bias signal B is added to or superimposed onto the input signal A from the input terminal 13 in the adder 14, and the output of the adder 14 is applied to the magnetic recording head 1.

A part of the output of the adder 14 is supplied to the low-pass filter 4 to obtain a signal in which high frequency components are cut off. The cut-off frequency of the low-pass filter 4 is set to a substantially center frequency of the band of signals to be recorded.

The above-mentioned biasing effect affecting a signal itself (called self-biasing effect) and the biasing effect of a high-frequency band signal affecting a low-frequency band signal (called mutual bias effect) are conspicuous on the high-frequency band side of the signal. Therefore, these effects can be compensated by the low-pass filter 4.

The output of the low-pass filter 4 is supplied to the peak detector 5. The quantity of effective bias detected by the peak detector 5 is supplied to the differential amplifier 6 in which it is compared with the voltage of the reference voltage source 9.

The voltage of the reference voltage source 9 is set to a value corresponding to the optimum bias quantity depending on the kind of a magnetic tape to be used.

The output C of the differential amplifier 6 serves to control the gain of the voltage control amplifier 10 to thereby keep the quantity of effective bias constant. That is, when the quantity of effective bias is insufficient, the output voltage of the peak detector 5 becomes lower than the voltage of the reference voltage source 9 so that the output voltage of the differential amplifier 6 becomes higher. As a result, the gain of the voltage control amplifier 10 becomes larger so that the quantity of effective bias increases.

On the contrary, when the quantity of effective bias is excessive, the output voltage of the peak detector 5, which detects the quantity of effective bias, becomes higher than the voltage of the reference voltage source 9, so that the output voltage of the differential amplifier 6 becomes lower. As a result, the gain of the voltage control amplifier 10 becomes smaller, thereby decreasing the quantity of effective bias.

According to the circuit of FIG. 3, it is possible to eliminate the aforesaid problem that the quantity of effective bias of the recording head is made deeper by the biasing effect affecting a signal itself to be recorded.

When the circuit in FIG. 3 is constituted by a semiconductor integrated circuit in order to be applied to, for example, an audio tape recorder or the like, however, there arise the following problems. That is, when a tape such as a metal tape or the like having a relatively large saturated magnetic field is used as a magnetic tape, a large quantity of bias is required and hence the terminal voltage of the recording head 1 takes a large value.

For example, if the bias frequency is selected to be about 100 kHz, the terminal voltage of the recording head 1 becomes about 100 Vpp. If such a high voltage is applied to the low-pass filter 4, an amount of power consumption is increased therein, and it is therefore necessary to set a value of the resistor 2 not less than 100KΩ in order to prevent the power consumption from increasing.

Further, if the low-pass filter 4 is constituted by such a resistor 2 having a large value, it is necessary to set the input impedance of the succeeding peak detector 5 to be not less than five times or, generally, to be about ten times as large as the value of the resistor 2 to so that the input impedance does not influence on the cut-off characteristic of the low-pass filter 4.

Since the cut-off frequency of the low-pass filter 4 is selected to be about 10 kHz, the input signal level of the peak detector 5 has a large amplitude of about 10 Vpp. It is therefore necessary to make the allowable input level of the peak detector 5 large enough as well as to secure a dynamic range. That is, the power source voltage must be made large. Further, such a large signal level requires a high-speed rising characteristic.

It has been therefore difficult to realize the circuit of FIG. 3 with a semiconductor integrated circuit.

OBJECTS AND SUMMARY OF THE INVENTION

It is therefore an object of the present invention to solve the foregoing problems of the aforesaid bias control circuit.

It is another object of the present invention to provide a bias control circuit which can be realized with a semiconductor integrated circuit easily.

As an aspect of the present invention, an AC bias control circuit for a magnetic recording head is comprised of an input terminal supplied with an input signal to be recorded, an oscillator for generating an AC bias signal, an amplifier for amplifying the AC bias signal with a gain corresponding to a control signal, an adder for adding an output of the amplifier to the input signal, a magnetic recording head supplied with an output of the adder, a band pass filter formed by a low pass filter and a high-pass filter each of which is constituted by a resistor and a capacitor, a peak detector supplied with an output of the band-pass filter, and a differential amplifier, supplied with an output of the peak detector and a predetermined voltage from a reference voltage source, for outputting the control signal.

As another aspect of the present invention, an AC bias control circuit for a magnetic recording head is comprised of an input terminal supplied with an input signal to be recorded, an oscillator for generating an AC bias signal, an amplifier for amplifying the AC bias signal with a gain corresponding to a control signal, an adder for adding an output of the amplifier to the input signal, a magnetic recording head supplied with an output of the adder, a band-pass filter supplied with a part of the output of the adder, a peak detector supplied with an output of the band-pass filter, and a differential amplifier, supplied with an output of the peak detector and a predetermined voltage from a reference voltage source, for outputting the control signal, wherein the band-pass filter is formed by a second resistor and a first capacitor connected in series between the input and output terminals of the band-pass filter, a third resistor connected between the ground and a connection point between the second resistor and one end of the first capacitor, and a second capacitor connected between the other end of the first capacitor and the ground.

As still another aspect of the present invention, an AC bias control circuit for a magnetic recording head is comprised of an input terminal supplied with an input signal to be recorded, an oscillator for generating an AC bias signal, an amplifier for amplifying the AC bias signal with a gain corresponding to a control signal, an adder for adding an output of the amplifier to the input signal, a magnetic recording head supplied with an output of the adder, a band-pass filter supplied with a part of the output of the adder, a peak detector supplied with an output of the band-pass filter, a first resistor and an AC bias source connected in series between an input terminal of the peak detector and the ground, and a differential amplifier, supplied with an output of the peak detector and a predetermined voltage from a reference voltage source, for outputting the control signal, wherein the band-pass filter is formed by a second resistor and a first capacitor connected in series between input and output terminals of the band-pass filter, a third resistor connected between the ground and a connection point between the second resistor and one end of the first capacitor, a second capacitor connected between the other end of the first capacitor and the ground, whereby the first capacitor and a first resistor which is connected between the input terminal of the peak detector and the ground provide a low-frequency band cut-off characteristic.

DETAILED DESCRIPTION OF THE PREFERRED EMBODIMENT

Figure 1:
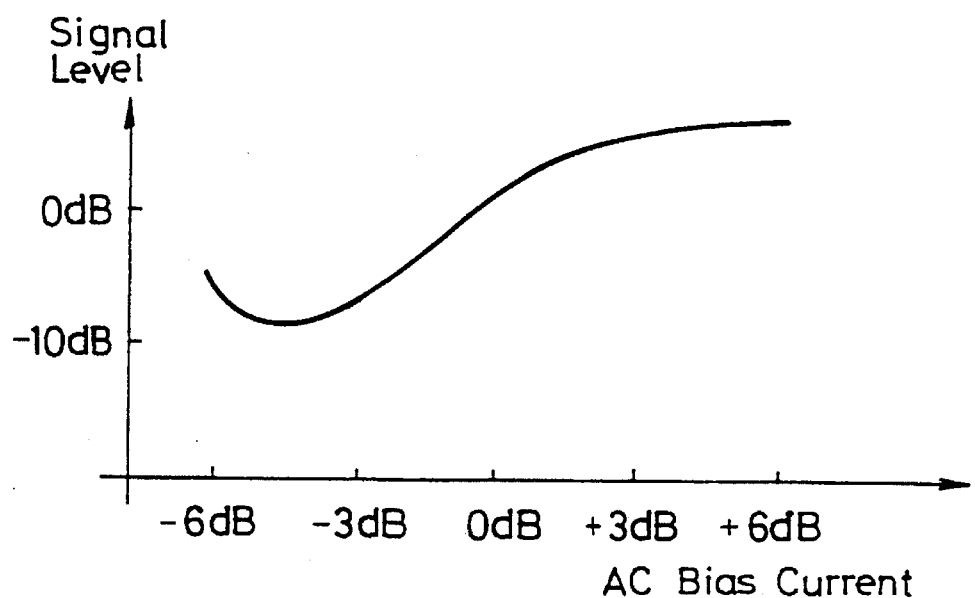
FIG. 1 is a diagram of a characteristic curve showing a relationship with respect to a low-frequency band signal between the quantity of AC bias and the maximum signal level recordable on a magnetic tape.
Figure 2:
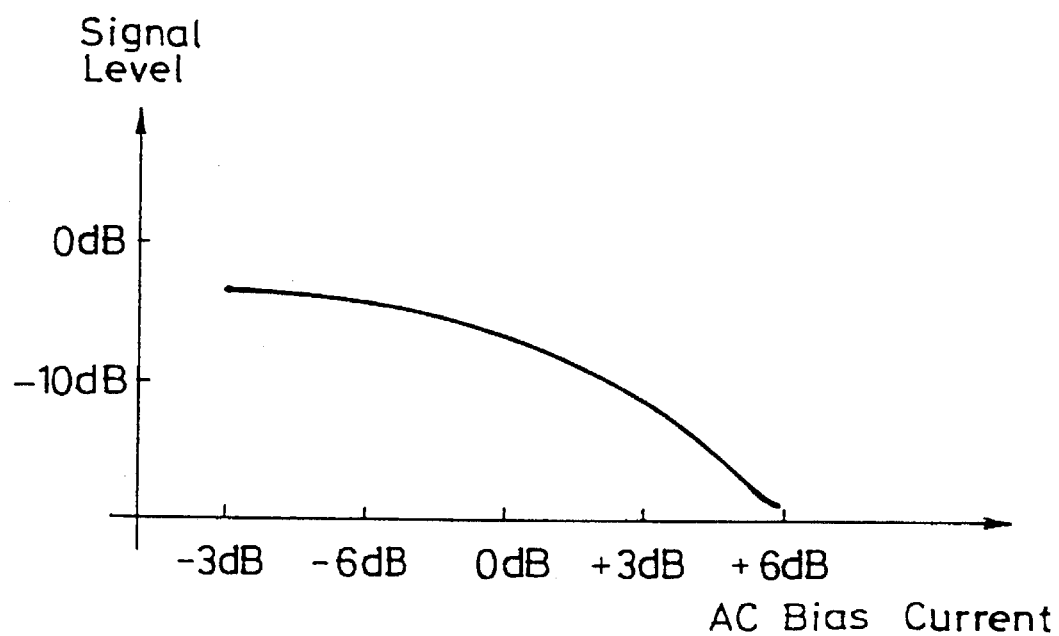
FIG. 2 is a diagram of a characteristic curve showing a relationship with respect to a high-frequency band signal between the quantity of AC bias and the maximum signal level recordable on a magnetic tape.
Figure 3:
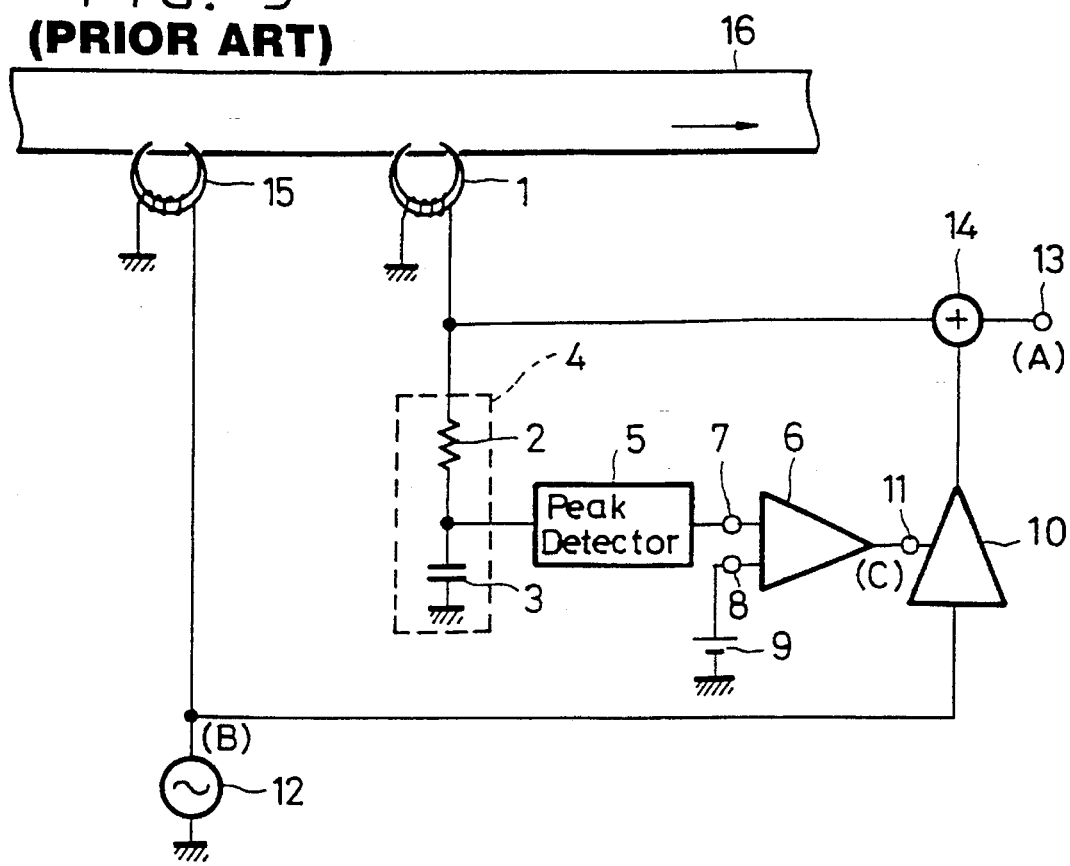
FIG. 3 is a diagram showing the circuit arrangement of the heretofore proposed bias control circuit.
Figure 4:
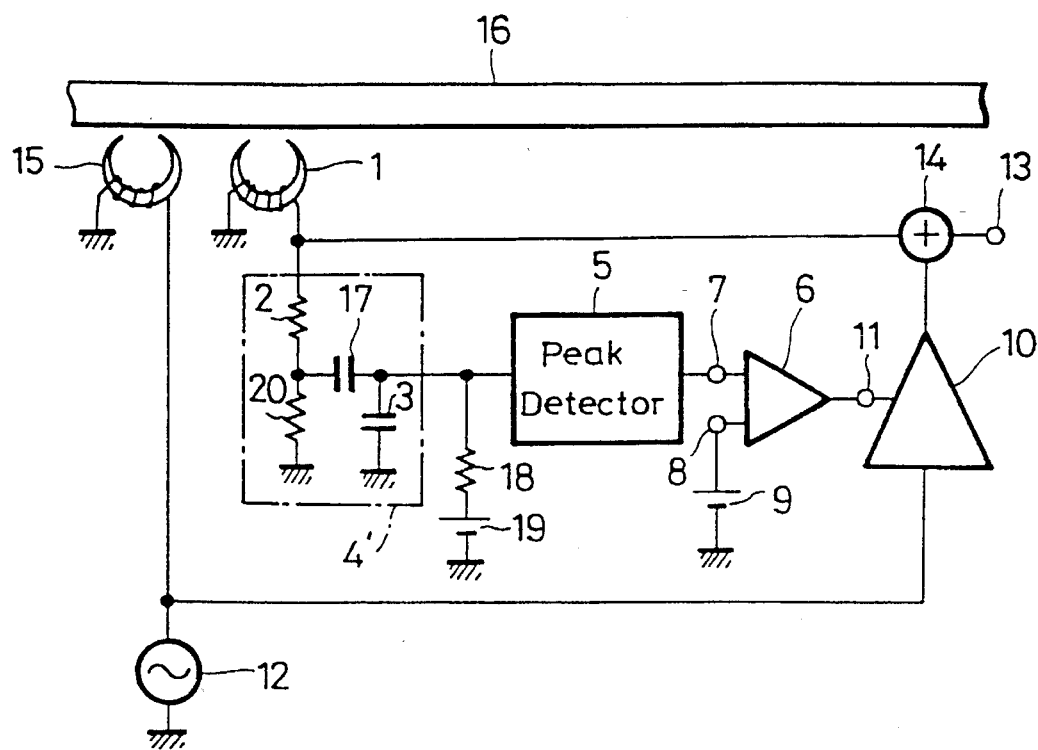
FIG. 4 is a diagram showing an embodiment of the circuit arrangement of the bias control circuit according to the present invention.

An AC bias control circuit according to an embodiment of the present invention will be described with reference to FIG. 4. The circuit of FIG. 4 is constituted by the same circuit arrangement as that of FIG. 3 except for a band-pass filter 4', a resistor 18 and a DC bias voltage source 19. In the figure, portions identical to those of FIG. 3 are referred to by the common symbols, with explanation thereof being omitted.

The input of the band-pass filter 4' is connected to one end of the driving coil of the magnetic head 1 and the output of the adder 14. The output of the band-pass filter 4' is connected to the input of the peak detector 5.

The band-pass filter 4' includes a resistor 2 and a capacitor 17 connected in series between the input and output of the band-pass filter 4'. The band-pass filter further includes a resistor 20 and a capacitor 3. The resistor 20 is connected between the ground and the connection point between the resistor 2 and one of the capacitor 17. The capacitor 3 is connected between an output terminal of the band-pass filter 4', that is, the other end of the capacitor 17 and the ground.

An input terminal of the peak detector 5 is connected to the DC bias voltage source 19 through the resistor 18. This resistor 18 is designed to cooperate with the capacitor 17 of the band-pass filter 4' to thereby provide a low frequency cut-off characteristic, as will be described later.

For the sake of simplifying the description, first, consideration is made on the transfer function of the band-pass filter 4' while the resistor 18 is disregarded. Supposing that the resistance value of the resistor 2 is R1, the resistance value of the resistor 20 is R2, the capacitance of the capacitor 17 is C1, the capacitance of the capacitor 3 is C2, the angular frequency of an input signal is ω and the capacitance C1 is much larger than the capacitance C2, then the transfer function F1 of the band-pass filter 4' can be expressed by the following expression (1).

$$F1 \approx \frac{R2}{R1+R2} \times \frac{1}{1+j\omega C2 \cdot \frac{R1 \cdot R2}{R1+R2}} \quad (1)$$

Therefore, this band-pass filter 4' has a high-frequency band cut-off frequency depending on the capacitance C2 of the capacitor 3. The low-frequency band cut-off characteristic formed by the capacitor 17 and the resist or 18 is obtained in such a manner that a voltage is divided with a ratio R2/(R1+R2) given by the resistors 2 and 20 and the divided voltage is multiplied by a transfer characteristic determined by the capacitance C1 of the capacitor 17 and the resistance value R3 of the resistor 18. Therefore, the low-frequency band cut-off characteristic can be expressed by the following expression (2).

$$F2 \approx \frac{R2}{R1+R2} \times \frac{1}{1+\frac{1}{j\omega C1R3}} \quad (2)$$

As is apparent from the expression (2), the second term of the expression (2) becomes smaller as the angular frequency ω is smaller. That is, there exists a low-frequency band cut-off frequency which is determined by the capacitance C1 of the capacitor 17.

In order to compare the circuit of the present invention shown in FIG. 4 with the circuit shown in FIG. 3, the transfer function F3 of the conventional circuit will be calculated. Supposing that the resistance value of the resistor 2 and the capacitance of the capacitor 3 which constitute the low-pass filter 4 are R and C, respectively, the transfer function F3 can be obtained by the following expression (3).

$$F3 = \frac{1}{1+j\omega CR} \quad (3)$$

When the expression (1) is compared with the expression (3), the second term of the expression (1) is in the same form of the expression (3). Therefore, a high-frequency band cut-off frequency can be established in the same manner as that in the conventional circuit when the values of C2, R1 and R2 are selected so as to satisfy the following equation:

$$CR=C2R1R2/(R1+R2) \quad (4)$$

As is apparent from the expression (1), an output signal of the band-pass filter 4' is R2/(R1+R2) times as large as an input signal thereof. Accordingly, the output impedance of the band-pass filter 4' can be made small when R2 is selected to be smaller than R1. Therefore, the impedance on input side of the peak detector 5 can be made small.

Further, since the level of an input signal to the peak detector 5 is proportional to R2/(R1+R2), the input signal to the peak detector 5 can be made small by making R2 small. Since the resistance value R1 of the resistor 2 can be made large, an amount of the power consumption in the band-pass filter 4' can be reduced.

The DC bias voltage source 19 serves to provide an optimum operation point to the peak detector 5. An AC output signal from the band-pass filter 4' is superimposed on the voltage provided by this DC bias voltage source 19.

The resistor 18 provides an input impedance with respect to the peak detector 5, and at the same time provides in cooperation with the capacitor 17 a low-frequency band cut-off characteristic of the signal frequency.

The resistor 18 may be replaced by an input resistance of the peak detector 5. In this case, it is possible to supply a bias inside the peak detector 5 easily.

As mentioned above, since the impedance on the input side of the peak detector 5 can be made small by making the resistance value R2 smaller than the resistance value R1, it is possible to make the resistance value R3 of the resistor 18 large.

Having described an embodiment of the bias control circuit according to the invention, the band-pass filter 4' and the resistor 18 can provide a function of a band-pass filter to the circuit. It is therefore possible to detect a peak upon an audio band frequency and eliminate a frequency components not higher than the audio frequency to thereby realize the optimum control.

Since the bias control circuit according to the present invention is arranged in the above-described manner, the bias control circuit can be easily formed by an integrated circuit, which has been difficult.

That is, even when the resistance value R1 of the resistor 2 of the band-pass filter 4' is set large and hence, a large terminal voltage is applied to the recording head 1, the power consumption in the band-pass filter 4' can be reduced. Further, since the resistance value R2 of the resistor 20 is set small, the resistance on the input side of the peak detector 5 can be made small.

Furthermore, since the signal supplied to the peak detector 5 has a value divided by the resistance values R1 and R2, the signal level supplied thereto is small. In addition, since the resistor 18 and the band-pass filter 4' connected to the input side of the peak detector 5 cooperate to provide a band-pass filter characteristic, it is possible to pass only a signal of an audio frequency band and eliminate a noise component to thereby obtain a superior control characteristic.

Having described a preferred embodiment of the invention with reference to the accompanying drawings, it is to be understood that the invention is not limited to that precise embodiment and that various changes and modifications could be effected therein by one skilled in the art without departing from the spirit or scope of the novel concepts of the invention as defined in the appended claims.

What is claimed is:

1. An AC bias control circuit for a magnetic recording head comprising:

an input terminal supplied with an input signal to be recorded;

an oscillator for generating an AC bias signal;

an amplifier for amplifying said AC bias signal with a gain corresponding to a control signal;

an adder for adding an output of said amplifier to said input signal;

a magnetic recording head supplied with an output of said adder;

a band pass filter formed by a low pass filter and a high-pass filter and having an input in circuit with said magnetic recording head, said band pass filter being constituted by a first combination of a first resistor and a first capacitor connected in series between an input and an output of said band pass filter;

a peak detector supplied with an output of said band-pass filter; and a differential amplifier, supplied with an output of said peak detector and a predetermined voltage from a reference voltage source, for outputting said control signal wherein said first combination includes said first resistor and a second resistor connected in series to form a resistive impedance path between said magnetic recording head and ground; and wherein said first resistor has a higher resistance value than said second resistor.

2. An AC bias control circuit for a magnetic recording head according to claim 1, wherein an output portion of said band-pass filter has a third resistor connected between said magnetic recording head and in circuit with the ground.

3. An AC bias control circuit for a magnetic head according to claim 1, wherein a part of said band-pass filter is constituted by said third resistor connected to an input terminal of said peak detector.

4. An AC bias control circuit for a magnetic recording head according to claim 3, wherein a bias from a bias source in circuit with ground is applied to said input of said peak detector through said third resistor.

5. An AC bias control circuit for a magnetic recording head comprising:

an input terminal supplied with an input signal to be recorded;

an oscillator for generating an AC bias signal;

an amplifier for amplifying said AC bias signal with a gain corresponding to a control signal;

an adder for adding an output of said amplifier to said input signal;

a magnetic recording head supplied with an output of said adder;

a band-pass filter supplied with a part of said output of said adder;

a peak detector supplied with an output of said band-pass filter;

a first resistor and an AC bias source connected in series between an input terminal of said peak detector and the ground; and a differential amplifier, supplied with an output of said peak detector and a predetermined voltage from a reference voltage source, for outputting said control signal, wherein said band-pass filter is formed by a second resistor and a first capacitor connected in series between the input and output terminals of said band-pass filter, a third resistor connected between the ground and a connection point between said second resistor and one end of said first capacitor, and a second capacitor connected between the other end of said first capacitor and the ground, wherein said second and third resistors are connected in series to form a purely resistive impedance path between said magnetic recording head and ground, and wherein said second resistor has a higher resistance value than said third resistor.

6. An AC bias control circuit for a magnetic recording head comprising:

an input terminal supplied with an input signal to be recorded;

an oscillator for generating an AC bias signal;

an amplifier for amplifying said AC bias signal with a gain corresponding to a control signal;

an adder for adding an output of said amplifier to said input signal;

a magnetic recording head supplied with an output of said adder;

a band-pass filter supplied with a part of said output of said adder;

a peak detector supplied with an output of said band-pass filter;

a first resistor and an AC bias source connected in series between an input terminal of said peak detector and the ground; and a differential amplifier, supplied with an output of said peak detector and a predetermined voltage from a reference voltage source, for outputting said control signal, wherein said band-pass filter is formed by a second resistor and a first capacitor connected in series between the input and output terminals of said band-pass filter, a third resistor connected between the ground and a connection point between said second resistor and one end of said first capacitor, a second capacitor connected between the other end of said first capacitor and the ground, whereby said first capacitor and said first resistor connected between said input terminal of said peak detector and the ground provide a low-frequency band cut-off characteristic, wherein said second and third resistors are connected in series to form a purely resistive impedance path between said magnetic recording head and ground and wherein said second resistor has a higher resistance value than said third resistor.

7. An AC bias control circuit for a magnetic recording head comprising:

a magnetic recording head;

an input terminal provided with a source of input signals to be recorded by said magnetic recording head;

an oscillator generating an AC bias signal;

an amplifier receiving and amplifying said AC bias signal at a gain determined by a control signal;

an adder for adding an output of said amplifier and said input signals and providing at its output a summed output signal to said magnetic recording head;

a bandpass filter having an input in circuit with said magnetic recording head and the output of said adder, and an output;

a peak detector having an input in circuit with the output of said bandpass filter and an output;

a differential amplifier having a first input terminal in circuit with an output of said peak detector and a second input terminal in circuit with a source of reference potential, and an output providing said control signal to said amplifier, said bandpass filter having a first resistor-capacitor circuit RC having a first resistor and a first capacitor connected in series between the input of the bandpass filter and the output of the bandpass filter, and a second resistor-capacitor circuit RC having a second resistor and a second capacitor, said second resistor connected at one end to a common junction between said first resistor and said first capacitor and at another end to ground, said second capacitor connected between said output of said bandpass filter and ground.

8. An AC bias control circuit as set forth in claim 7, further comprising a combination of a DC bias voltage source in circuit with a third resistor, said combination being connected between ground and an input of said peak detector.

9. An AC bias control circuit as set forth in claim 8, wherein said third resistor cooperates with said second capacitor to provide a low frequency cut-off characteristic to said bandpass filter.

10. An AC bias control circuit as set forth in claim 8, wherein the band-pass filter has a high-frequency cut-off frequency depending on the capacitance of the second capacitor and a low-frequency cut-off characteristic formed by the first capacitor and the third resistor.

11. An AC bias control circuit as set forth in claim 8, wherein said second resistor is smaller than said first resistor.

* * * * *